Nov. 14, 1967  P. TOURNOIS  3,353,120
ACOUSTIC PROPAGATION LINE FOR COMPRESSING
TRAINS OF ELECTRIC WAVES
Filed Jan. 14, 1965  4 Sheets-Sheet 2

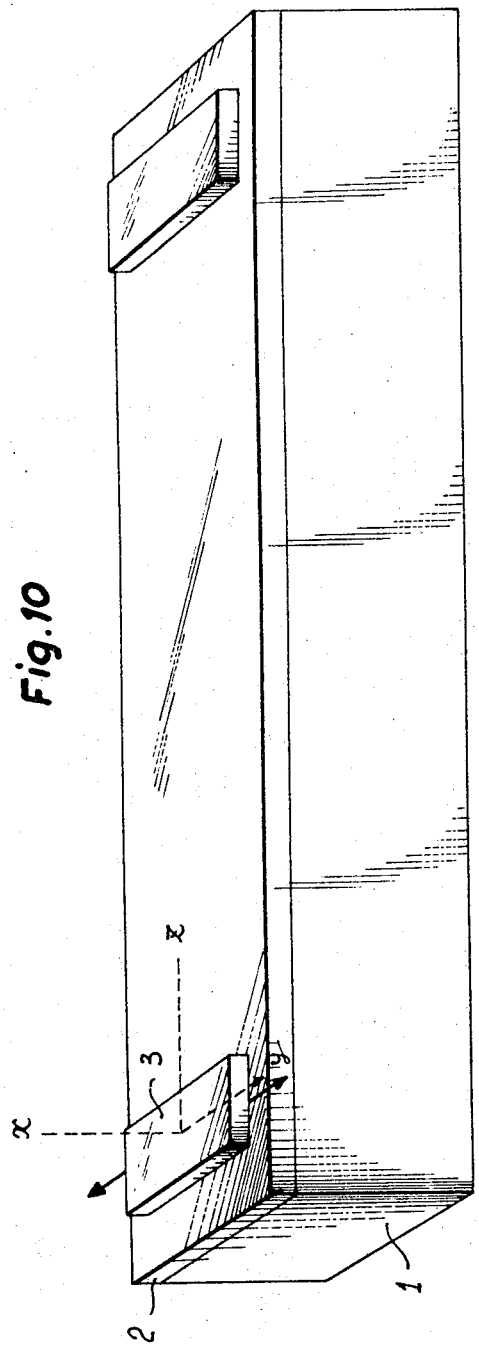
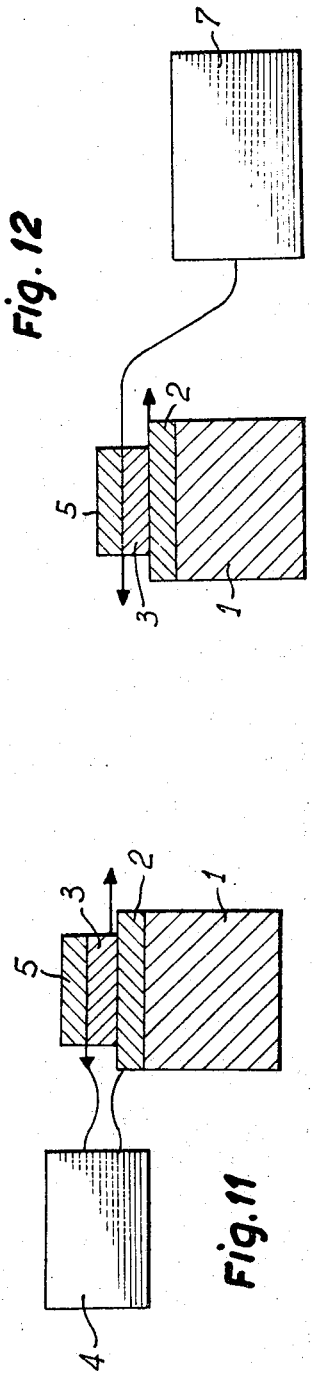
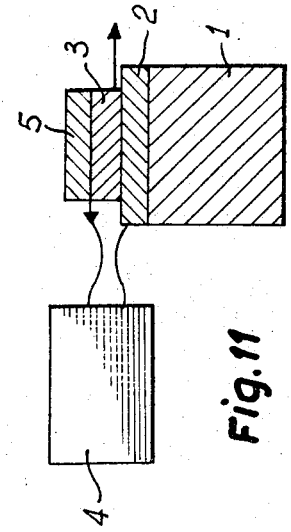

_United States Patent Office_

3,353,120
Patented Nov. 14, 1967

3,353,120
ACOUSTIC PROPAGATION LINE FOR COMPRESSING TRAINS OF ELECTRIC WAVES
Pierre Tournois, Paris, France, assignor to CSF—Compagnie Generale de Telegraphie Sans Fil, a corporation of France
Filed Jan. 14, 1965, Ser. No. 425,428
Claims priority, application France, Jan. 15, 1964, 960,326, Patent 1,390,365
5 Claims. (Cl. 333—30)

The present invention relates to acoustic wave propagation lines more particularly for use in radar technics.

In such technics the problem often arises of determining the time interval which elapsed between the start of the transmission of a wave train and the start of reception of an echo of this train.

The problem is specially complicated when in order to increase the amount of energy radiated without increasing the peak power, the duration of the wave train has been made greater than the out and return time of this train for a probable echo.

To solve this problem arrangements have been proposed which make it possible, at the receiver, to reduce or compress the duration of an echo signal. The arrangements used are based on the use of lumped constants lines, or of heavy and bulky delay lines.

It is object of the present invention to provide an arrangement which solves this problem in a much simpler way.

According to the invention there is provided an acoustic dispersive line comprising an elongated base of a first rigid material covered with a thin layer of a second rigid material, in which the phase velocity of a mechanical vibration is lower than in said first material and electromechanical transducers respectively coupled to the ends of said layer.

For a better understanding of the invention and to show how the same may be carried into effect reference will be made to the drawings, accompanying the following description and wherein:

FIG. 10 is a circuit diagram of an arrangement according to the invention;

FIGS. 11 and 12 are respective end views of the arrangement of FIG. 10; and

Figure 1:
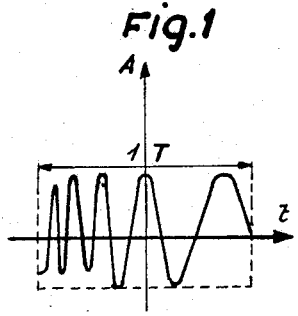
FIGS. 1, 2, 3, 4, 5 and 6 are curves which explain the problem to be solved.
Figure 2:
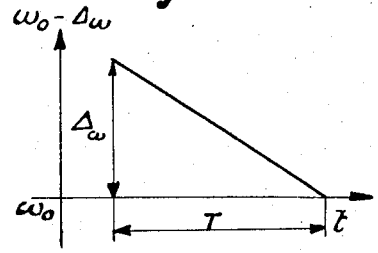

In FIG. 1 there is shown a wave train emitted during a time interval T, and frequency modulated following a linear law starting from the highest frequency. The law of modlation $\omega = f(t)$ is shown in FIG. 2: the angular frequency varies linearly from $\omega = \omega_0$ at the start of the wave train, to $\omega = \omega_0 - \Delta\omega$.

The problem consists in generating a short signal in response to this wave train.

To this end it is known to use dispersive propagation lines, i.e. lines in which the propagation constant is a function of the frequency of the wave. In general such lines consist of discrete cells, but in order to simplify matters it will be assumed that they actually are lines in which there is propagated a wave with a specific wave number K, a wave number being $2\pi/\lambda$, $\lambda$ being the operating wave length in the line.

The line used is one in which the wave number is related to the angular frequency by a relation of the form:

$$\omega^2 = \alpha K \quad (1)$$

where $\alpha$ is a constant.

Writing the wave's group velocity in the line $$Vg = \frac{d\omega}{dK} = \beta K^{-\frac{1}{2}} = \frac{\alpha}{2\omega} \quad (2)$$

the time of propagation is $$t_p = \frac{l}{Vg} = \gamma\omega \quad (3)$$

Figure 3:
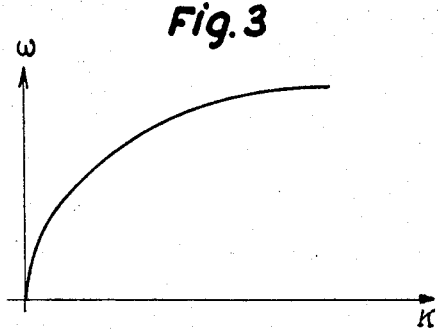
Figure 4:
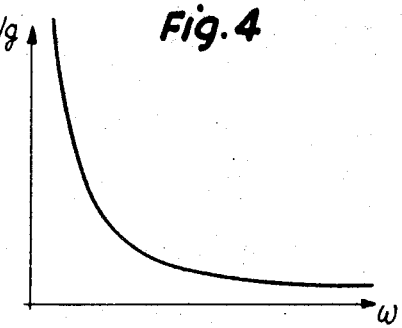
Figure 5:
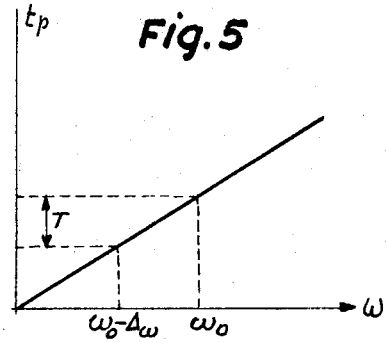

$l$ being the length of the line, and $\alpha$, $\beta$, $\gamma$ being constants.
FIGS. 3, 4 and 5 are respective curves showing the variation of K, Vg and $t_p$ as a function of $\omega$.

Figure 6:
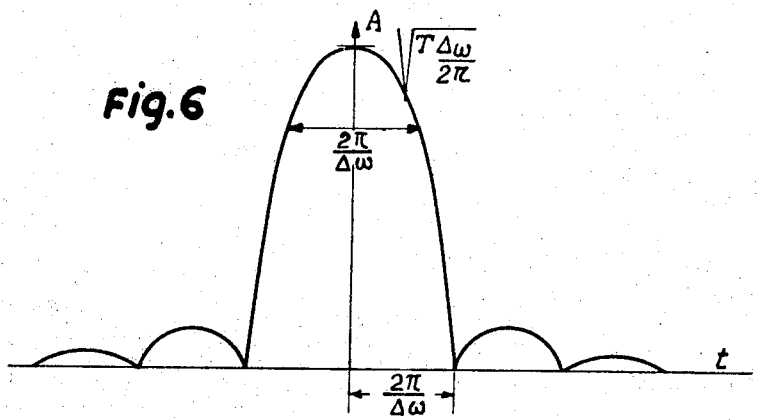

It can be shown that if, at the input of a dispersive line possessing these propagation characteristics, a wave train is injected, such as that shown in FIG. 1, there will appear at the output, after a given travelling length, a train of waves also frequency modulated, but whose envelope is as shown in FIG. 6. The value of the maximum amplitude is:

$$\sqrt{T\frac{\Delta\omega}{2\pi}}$$

The whole of the energy is practically concentrated in a curve of width $2\pi/\Delta\omega$, the amplitude being zero at the instants separated by intervals $2\pi/\Delta\omega$.

So far, for achieving this object delay lines or other costly and bulky devices have been used.

Figure 7:
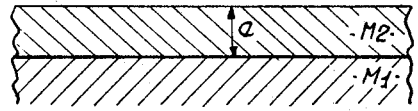
FIGS. 7, 8 and 9 show the principle of the invention.

According to the present invention it is proposed to use metal bars built up from two metal layers as shown in FIG. 7, one layer M2 being of very small thickness $e$, and the other M1 very thick as compared to M2.

Figure 8:
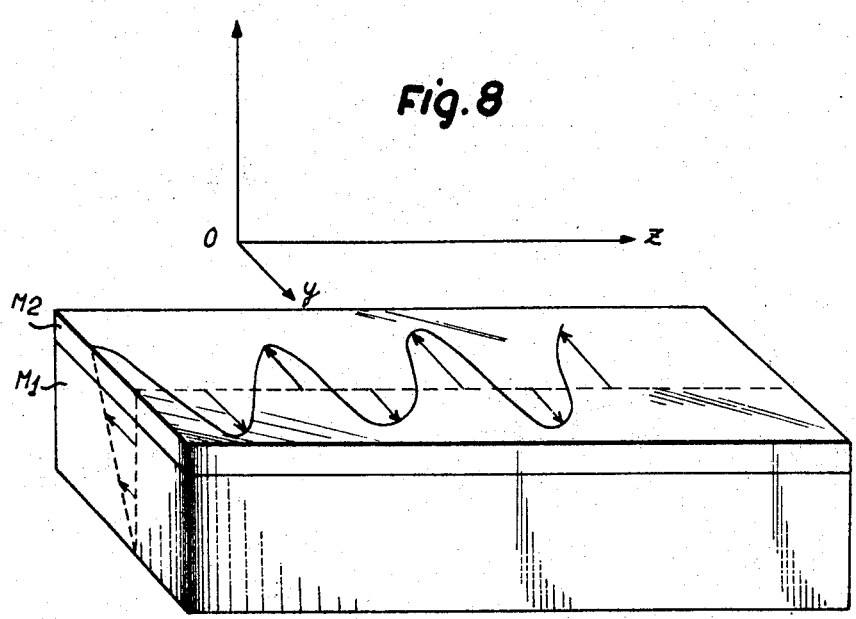

It is known that if such a bar, is subjected as shown in FIG. 8, to transverse vibrations propagated in direction Oz, the elongation of the vibration being in the direction Oy, normal to Oz and that if the velocity C2 of such waves in medium M2 is less than the velocity C1 of such waves in medium M1, surface waves, or Love waves, will appear in the system. These waves will possess a velocity C3, with $C2<C3<C1$. The amplitude of the surface wave, is attenuated within layer M1 exponentially with the depth, as shown in FIG. 8, the vibrator energy being thus concentrated in M2.

Figure 9:
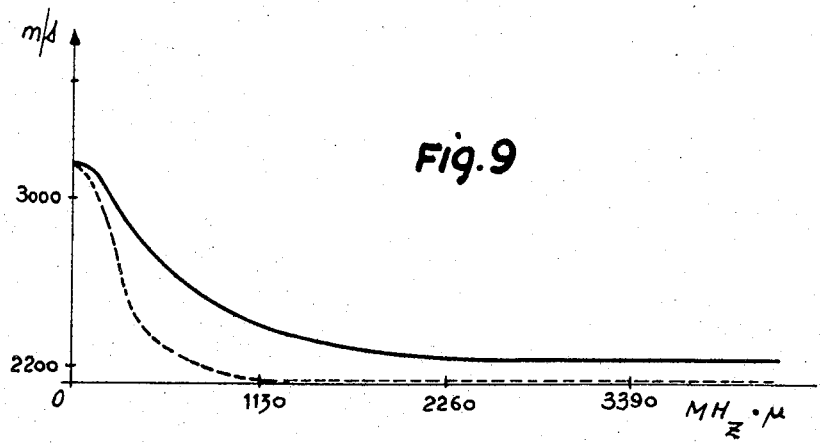

The shown experimental curves of FIG. 9 show respectively in full and dotted line the variations of the phase and group velocities expressed in meters per second as a function of the product of the penetration depth in layer by the wave frequency.

The figure shows that a large part of these curves $Vg = Vg(\nu)$ for $e$ constant is hyperbolic in form, as shown in FIG. 4.

It can be shown that the line's dispersive properties are such that if a pulse train as that shown in FIG. 1, is applied to one end of the line, the train which appears at the output after a given travelling length is as shown in FIG. 6.

The time delay curve of FIG. 9 is linear for the values of parameter $e\nu$ lying between 200 and 600 units expressed in mc./s. $\mu$.

That is to say that in the case of a copper layer $70\mu$ thick, deposited on iron, the lower and upper frequency limits are respectively 2.85 mHz. and 8.57 mHz.; at a centre frequency $\nu_0$ of 5 mc./s., it is thus possible to utilise a 2 mHz. frequency band of $\Delta\nu$ about $\nu_0$, this corresponding to a compressed pulse of $0.5\mu$, as shown in FIGURE 6.

FIG. 10 shows one embodiment of a device according to the invention given by way of example.

It consists of a thick, rectangular bar 1, e.g., of iron. This bar is coated with a copper film 2, which may be $70\mu$ thick for example.

At one end of the bar there is placed an electrostrictive transducer 3 connected, as shown in FIG. 11 which is an end view of the same device to the intermediate frequency stage 4 of a chirp radar receiver, for example. An additional body 5 is welded to the transducer for loading said transducer by an inertance coupled to its external face.

This vibrator exerts on the bar a transverse alternating stress, as shown by the arrows.

At the other end of the line, as shown in FIG. 12 there is placed an identical receiving transducer, built up in the same manner composed of the same parts, connected to a later stage 7 of the radar receiver.

The operation of the system is self evident.

This arrangement possesses a drawback:

The wavelength of the Love waves is small, four to five tenths of a millimeter and the dimensions of transducer 3 are large compared to this wavelength. Since its surface is an equiphase surface of the vibration, there results poor coupling with the bar.

Figure 13:
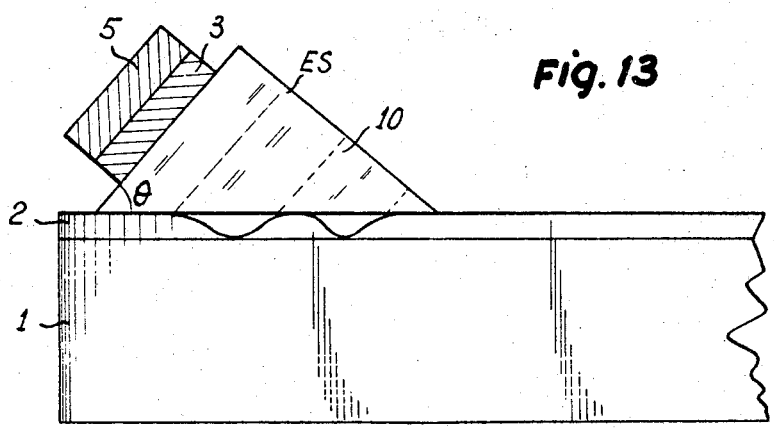
FIG. 13 is a circuit diagram of another example of realization of the invention.

The arrangement of FIG. 13 is free of this drawback. It shows in cross-section an exciter system which is better matched than that of the previous figures.

In this figure the same reference numbers designate the same parts, as in the previous figures. Vibrator 3 which exerts stresses perpendicular to the plane of the figure is applied to a Perspex prism 10, for example, in which the propagation velocity of the transverse waves is of order of $Vp=1120$ m./s., and whose aris angle $\theta$ is such that sin $$\theta = \frac{Vp}{C_3}$$

where $C_3$ is the Love waves velocity; in action, the vibrator causes the formation in the prism of equiphase surfaces $Es$ which, by coupling in layer 2, bring about the formation of distant equiphase surfaces of the proper wavelength to excite Love waves.

Of course the invention is not limited to the embodiments described and shown which were given solely by way of example.

What is claimed is:

1. An acoustic dispersive line, comprising an elongated base of a first rigid material having two faces; a thin layer of a second rigid material deposited over one of said faces coextensively therewith and having two ends; said second material having, for a given mechanical vibration, a phase velocity lower than said first material; a first electromechanical transducer, coupled to one of said two ends of said layer for exciting therein a transverse vibration, and having an electric input, and a second electromechanical transducer coupled to the other end of said layer, and having an output.

2. An acoustic dispersive line, comprising a prismatic base of a first rigid material having two faces; a thin layer of a second rigid material deposited over one of said faces, coextensively therewith and having two ends; said second material having for a transverse mechanical vibration, a phase velocity lower than said first material, a first electrostrictive transducer coupled to one of said two ends of said layer, for exciting therein a transverse vibration, and having an electric input for receiving an input frequency modulated signal, and a second electrostrictive transducer coupled to the other end of said layer, and having an output, for delivering an output frequency modulated signal.

3. An acoustic dispersive line, comprising a prismatic base of a first rigid material having two faces; a thin layer of a second rigid material deposited over one of said faces coextensively therewith and having two ends; said second material having for a transverse mechanical vibration a phase velocity lower than said first material; a first and a second prismatic coupler respectively applied on said two ends of said layer, having respectively one face oblique with respect to said layer, a first electrostrictive transducer coupled to said oblique face for exciting therein a transverse vibration, and having an electric input for receiving an input frequency modulated signal, and a second electrostrictive transducer coupled to said oblique face of said second coupler and having an output, for delivering an output frequency modulated signal.

4. An acoustic dispersive line, comprising a prismatic base of a first rigid material having two faces; a thin layer of a second rigid material deposited over one of said faces coextensively therewith and having two ends; said second material having for a transverse mechanical vibration a phase velocity lower than said first material; a first and a second prismatic coupler respectively applied on said two ends of said layer, having respectively one face oblique with respect to said layers, a first electrostrictive transducer coupled to said oblique face for exciting therein a transverse vibration, and having an electric input for receiving an input frequency modulated signal, and a second electrostrictive transducer coupled to said oblique face of said second coupler and having an output, for delivering an output frequency modulated signal, said oblique faces of said couplers forming an angle with said layer, the cosine of which being equal to the ratio of the wavelengths of the excited wave in said coupler, and in said layer.

5. An acoustic dispersive line, comprising a prismatic base of a first rigid material, having two faces; a thin layer of a second rigid material deposited over one of said faces, coextensively therewith and having two ends; said second material having for a transverse mechanical vibration a phase velocity lower than for said first material; a first and a second prismatic coupler respectively applied on said two ends of said layer having respectively one face oblique with respect to said layer; a first electrostrictive transducer coupled to said oblique face for exciting therein a transverse vibration and having an electric input for receiving an input linearly frequency modulated pulsed signal and a second electrostrictive transducer coupled to said oblique face of said second coupler and having an output for delivering an output frequency modulated signal; said oblique faces of said couplers forming an angle with said layer, the cosine of which being equal to the ratio of the wavelengths of the excited wave in said coupler, and in said layer.

References Cited

UNITED STATES PATENTS

| | | | |
|---|---|---|---|
| 2,439,130 | 4/1948 | Firestone | 73—67.8 |
| 2,439,131 | 4/1948 | Firestone | 73—67.8 |
| 2,707,755 | 5/1955 | Hardie et al. | 73—67.9 X |
| 3,057,189 | 10/1962 | Joy | 73—67.8 |
| 3,070,761 | 12/1962 | Rankin | |
| 3,212,072 | 10/1965 | Fuller. | 333—30 |

RODNEY D. BENNETT, *Primary Examiner.*

SAMUEL W. ENGLE, BENJAMIN A. BORCHELT,
*Examiners.*

M. F. HUBLER, *Assistant Examiner.*